Feb. 6, 1951 C. F. CARLSON 2,540,863

SLIDE WIRE PERMEABILITY TUNER

Filed Feb. 26, 1946

INVENTOR
Chester F. Carlson

Patented Feb. 6, 1951

2,540,863

UNITED STATES PATENT OFFICE 2,540,863

SLIDE WIRE PERMEABILITY TUNER

Chester F. Carlson, Woodside, N. Y., assignor to P. R. Mallory & Co., Inc., Indianapolis, Ind., a corporation of Delaware Application February 26, 1946, Serial No. 650,363

6 Claims. (Cl. 171—777)

This invention relates to variable inductance tuners and particularly to such tuners in which a magnetic core structure is utilized.

An object of the invention is to improve the construction and operation of inductance tuners.

Other objects of the invention will be apparent from the following description and accompanying drawings taken in connection with the appended claims.

The invention accordingly comprises the features of construction, combination of elements, arrangement of parts, and methods of manufacture referred to above or which will be brought out and exemplified in the disclosure hereinafter set forth, including the illustrations in the drawings, the scope of the invention being indicated in the appended claims.

Figure 1:
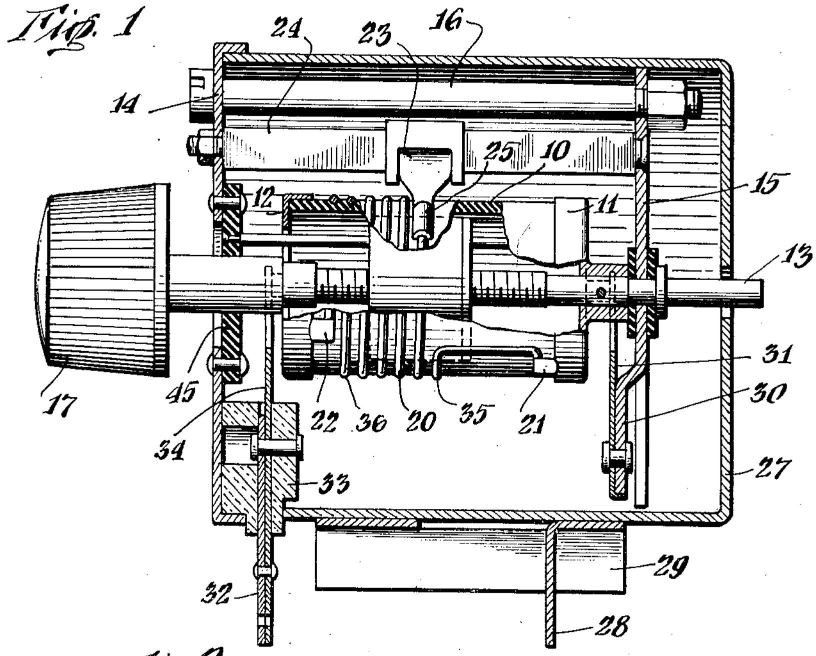
Figure 1 is a vertical sectional view, partially in elevation, of an inductance tuner constructed in accordance with the invention.

This invention contemplates a slide wire variable inductance tuning device embodying a movable magnetically permeable high frequency core element. It is thereby possible to effect tuning over a wide tuning band.

Although slide wire inductance tuners afford many important advantages over conventional variable condenser tuning, it has been found that the frequency variation per turn of such tuners is considerably greater at the high frequency end of the tuning range than at the low frequency end. This difficulty may be overcome, to some extent, by utilizing a core of pressed powdered paramagnetic material to increase the inductance variation at the low frequency part of the tuning range. With such tuners, however, the hysteresis and the eddy current losses at high frequencies are oftentimes excessive. According to this invention, this disadvantage is overcome by providing a movable paramagnetic core which moves longitudinally of the coil as the tuner is adjusted. The core is adjusted so that the entire area thereof is coupled to the coil at the low frequency end of the tuning range to thereby increase the frequency variation per turn of the tuner. As the device is tuned to higher frequencies, the core moves out of the coil until the entire core is removed from the active portion of the coil at an intermediate part of the tuning range. The effect of the core is thereby reduced to a negligible value so that no hysteresis or eddy current losses are present at the higher frequencies. Consequently, the full advantage of paramagnetic core is obtained at low frequencies while harmful or excessive losses resulting from the magnetic core are avoided at the higher frequencies.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring now to the drawings in detail, a cylindrical shell or coil form 10, which is preferably formed from an insulating material such, for example, as a synthetic resin, resin impregnated fiber or ceramic material, is provided with end caps 11 and 12, end cap 11 being fixed on a threaded control shaft 13. This shaft is suitably journaled in a pair of end plates 14, 15 which are separated by a plurality of spacers, one of which is shown at 16. A knob 17 may be provided for adjusting the tuner in the manner hereinafter described. One end of the coil form may be grooved to receive a bare wire helical coil 20, and the other end of the form may be smooth since the latter end serves only to enclose the movable core structure in the manner hereinafter described. The opposite ends of the coil 20 may be attached to the respective end caps 11, 12, as by upturned lugs 21, 22.

A metal contactor 23 is slidable longitudinally of the coil in a suitable groove, not shown, formed in a trolley rod 24 which is supported between the end plates 14, 15 in any suitable manner. The contactor is provided with a plurality of grooved contact nibs as at 25 which slide along the turns of the coil as it is rotated by the knob 17 thus causing the contactor 23 to move longitudinally along the trolley rod to thereby afford a variable inductance tuning connection to the coil. The nibs 25 may be prevented from sliding off the end of the coil by a stop member which is slidable with the contactor and adapted to engage the lug 22 to prevent further rotation of the coil when the contactor reaches its end position.

The tuner may be enclosed by a shield can 27 which is in contact with a lug 28 formed on a suitable flanged mounting base 29. The lug or terminal 28 affords a connection to the contactor 23 through shield can 27, end plates 14, 15 and the trolley rod 24. The lug 28 is also connected to the end cap 11 through a member 30 formed on the end plate 15, the member 30 being in contact with a brush 31 which slides against the end cap 11. A connection to the end of the coil adjacent end cap 12 is afforded by a contact lug 32 which is mounted on an insulating block 33 and connected to a brush 34 in sliding contact with the end cap 12. It will be apparent that the portion of the coil between the contactor 23 and the end cap 11 is short-circuited. Accordingly, the inductance decreases and the tuned frequency increases as the contactor moves toward the end cap 12. Consequently, the end portion 35 of the coil will be hereinafter referred to as the low frequency end while the end portion 36 will be hereinafter referred to as the high frequency end.

According to the invention, a bonded iron powder core 40 is provided which is movable longitudinally with respect to the coil. The core is mounted on an insulating member 41 which is screw threaded to the threaded portion 42 of the control shaft. The member 41 has an integral abutment 43 to prevent the core from touching the end cap 11 in its longitudinal movement along the shaft 13. Rotation of the core structure is prevented by a rod 44 which extends through a suitable passage formed in the supporting member 41 and through a central aperture in end cap 12, the end of the rod 44 being attached to a suitable insulating block 45 fixed on the end plate 14. Consequently, as the shaft is rotated, the core and the support move longitudinally within the coil form.

Figures 2, 3:
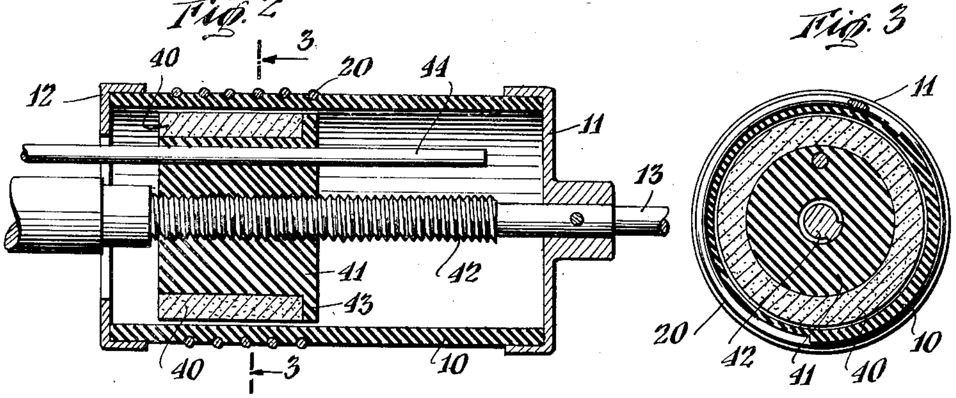
Figure 2 is a sectional view of the core structure for the inductance tuner shown in Figure 1.
Figure 3 is a sectional view taken along the line 3—3 of Figure 2.

It will be apparent that the entire outer area of the core is closely spaced and coupled to the coil when the parts are in the respective positions shown in Figure 2. At this time, the contactor 23 is at the low frequency end of the coil so that the entire core is effective to increase the inductance of the tuner. As the contactor moves toward the high frequency end of the coil, the core moves in the opposite direction toward end cap 11 so that the effective amount of iron in the core constantly decreases as the high frequency end of the coil is approached. When the contactor 23 is adjacent the end of the core, the effect of the core is substantially removed since the core is enclosed by the low frequency end of the coil which is short-circuited in the manner previously described. As the contactor continues to move toward the high frequency end, the core approaches the end cap 11 and is still ineffective to affect the tuned frequency since it is not enclosed by the active part of the core. Accordingly, at the high frequency end the effect of the iron core with the resultant hysteresis and eddy current losses is eliminated while the full effect of the core is obtained at the low frequency end with resultant increase both in the inductance variation per turn and in total inductance of the tuner.

Figure 4:
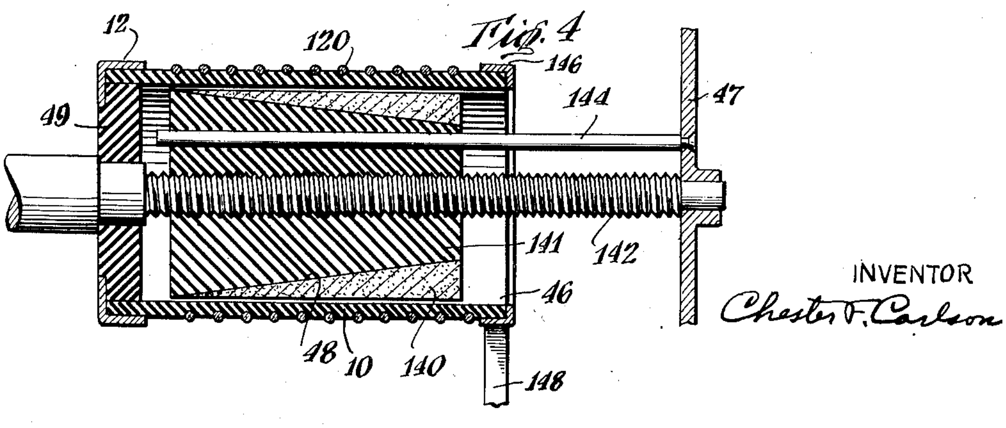
Figure 4 is a sectional view illustrating a modified form of core construction.

In the modification of the invention shown in Figure 4, parts similar to those already described are indicated by like reference characters. The modified form of tuner comprises a coil 120 which is wound over the entire surface of the form 10, one end of the coil being open, as indicated at 46, to allow the core 140 and the core support 141 to move beyond the end of the coil as the tuner is adjusted to higher frequencies. In this case, the threaded portion 142 of the control shaft and the rod 144 are extended to allow the core to move outside the coil form at the high frequency part of the tuning range. Thus, the entire surface of the coil form may be utilized for the coil windings while the advantages of the movable magnetic core are nevertheless obtained.

The free end of the control shaft may be journaled in a suitable plate 47 and the rod 144 may be riveted or otherwise suitably secured to the plate 47. A block of insulating material 49 may be fixed on the shaft 142, said block fitting into the apertured end cap 12 to support the coil form upon the shaft. The end of the core opposite the cap 12 may be provided with an end cap 146 which is suitably connected to the adjacent end of the coil, the cap 146 coacting with a suitable brush 148 to make an electrical connection to said adjacent end of the coil. The inner face of the end cap 146 should not protrude inwardly of the core 10 in order to provide a free unobstructed path for the movement of the core. The core 140 may be interiorly tapered, as indicated at 48, in order to progressively decrease the amount of iron effective in the core as the high frequency end of the coil is approached. By varying the taper, the frequency variation per turn may be adjusted in order to obtain any desired calibration as for band spreading or for other purposes.

While the present invention, as to its objects and advantages, has been described herein as carried out in specific embodiments thereof, it is not desired to be limited thereby but it is intended to cover the invention broadly within the spirit and scope of the appended claims.

What is claimed as new and desired to be secured by Letters Patent is:

1. A slide wire variable inductance device for tuning a radio frequency circuit comprising a rotatable threaded shaft, a coil form mounted on said shaft and rotatable therewith as a whole, a bare inductive tuning coil wound around said form in fixed relation thereto, a trolley rod extending longitudinally of said coil, a contactor assembly adapted to travel along the trolley rod in contact with a fractional portion of any one turn of said coil, said assembly having a contact member in engagement with said coil whereby rotation of said coil causes the contactor assembly to move longitudinally along said trolley rod, a core of pressed powdered paramagnetic material mounted on the threaded portion of the shaft, and means for restraining rotation of said core whereby the core moves longitudinally of the coil during rotation of said shaft, said core and said contactor assembly moving in opposite directions as the shaft is rotated to thereby vary the inductance of said tuning device in progressively increasing steps per coil revolution as the low frequency end of the tuning range is approached.

2. A slide wire variable inductance device for tuning a radio frequency circuit comprising a rotatable threaded shaft, a coil form mounted on said shaft, a bare inductive tuning coil wound around said form and fixed thereto, a trolley rod extended longitudinally of said coil, a contactor assembly adapted to travel along the trolley rod in contact with a fractional portion of any one turn of said coil, said assembly having a contact member in engagement with said coil whereby rotation of said coil causes the contactor assembly to move longitudinally along said trolley rod, a core of pressed powdered paramagnetic material mounted on the threaded portion of the shaft, and means for restraining rotation of said core whereby the core moves longitudinally of the coil during rotation of said shaft, said core and said contactor assembly moving in opposite directions as the shaft is rotated to thereby vary the inductance of said tuning device, said core being coupled to the coil throughout its length at the low frequency end of the tuning range and the position of said core being electrically correlated with the position of said contact member, said core being outside the coil at the high frequency end of the range whereby the effect of the core is removed at an intermediate portion of the tuning range.

3. A slide wire variable inductance device for tuning a radio frequency circuit comprising a rotatable threaded shaft, a coil form mounted on said shaft, a bare inductive tuning coil wound around said form and fixed thereto, a trolley rod extending longitudinally of said coil, a contactor assembly adapted to travel along said trolley rod in contact with a fractional portion of any one turn of said coil, said assembly having a contact member in engagement with said coil whereby rotation of said coil causes the contactor assembly to move longitudinally along said trolley rod, an insulating member mounted within the coil form on the threaded portion of said shaft, a stationary rod extending through said member to restrain rotation thereof whereby said member travels longitudinally of the coil form as the shaft is rotated, and a core of bonded iron powder mounted on said member and adapted to be coupled with said coil, said core and said contactor assembly moving in opposite directions as the shaft is rotated to thereby vary the inductance of said tuning device in progressively increasing steps per coil revolution as the low frequency end of the tuning range is approached.

4. A slide wire variable inductance device for tuning a radio frequency circuit comprising a bare conductor formed into a coil having substantially fixed turns therein, means for rotating said coil, a contactor assembly having a contact member engaging a fractional portion of any one turn of said coil whereby rotation of the said coil moves said contact member and said assembly longitudinally of the coil, a movable core of paramagnetic material disposed within said coil and adapted to be coupled thereto, and means responsive to the rotation of said coil for moving said core in opposite direction with respect to the movement of said contactor assembly, said core being coupled to the coil throughout its length at the low frequency end of the tuning range, said core being outside the coil at the high frequency end of the range whereby the effect of the core is removed at an intermediate portion of the tuning range.

5. A slide wire variable inductance device for tuning a radio frequency circuit comprising a bare conductor formed into a coil having substantially fixed turns therein, means for rotating said coil, a contactor assembly having a contact member engaging a fractional portion of any one turn of said coil whereby rotation of the said coil moves said contact member and said assembly longitudinally of the coil, a movable tapered core of pressed powdered paramagnetic material disposed within said coil and adapted to be coupled thereto, and means responsive to the rotation of said coil for moving the core longitudinally of the coil in opposite direction with respect to the movement of said contactor assembly whereby said tapered core is effective to progressively increase the inductance variation per coil revolution as the low frequency end of the tuning range is approached.

6. A slide wire variable inductance device for tuning a radio frequency circuit comprising a bare conductor formed into a coil having substantially rigid turns therein, means for rotating said coil, a contactor assembly having a contact member engaging a fractional portion of any one turn of said coil whereby rotation of said coil moves said contact member and said assembly longitudinally of the coil, a movable core of paramagnetic material disposed within said coil and adapted to be coupled thereto, and means responsive to the rotation of said coil for moving said core in an opposite direction with respect to the movement of said contactor assembly to progressively increase the inductance variation per coil revolution as the low frequency end of the tuning range is approached.

CHESTER F. CARLSON.

REFERENCES CITED

The following references are of record in the file of this patent:

UNITED STATES PATENTS

| Number | Name | Date |
|---|---|---|
| 2,175,554 | Bliss | Oct. 10, 1939 |
| 2,370,714 | Carlson | Mar. 6, 1945 |
| 2,399,060 | Puerner | Apr. 23, 1946 |
| 2,423,824 | Beetham | July 15, 1947 |
| 2,460,138 | Lynn | Jan. 25, 1949 |